(12) United States Patent
Huang et al.

(10) Patent No.: US 10,661,320 B2
(45) Date of Patent: May 26, 2020

(54) METHOD AND APPARATUS FOR DEWATERING BIOLOGICAL SOLID MATERIAL EMPLOYING BOTH MICROWAVE IRRADIATION AND SOLVENT EXTRACTION

(71) Applicant: SOUTHEAST UNIVERSITY, Nanjing (CN)

(72) Inventors: Ying Huang, Nanjing (CN); Dong Zhang, Nanjing (CN); Zizeng Lin, Nanjing (CN); Zhiwei Shi, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 183 days.

(21) Appl. No.: 15/779,115

(22) PCT Filed: Oct. 27, 2016

(86) PCT No.: PCT/CN2016/103462
§ 371 (c)(1),
(2) Date: May 25, 2018

(87) PCT Pub. No.: WO2017/088624
PCT Pub. Date: Jun. 1, 2017

(65) Prior Publication Data
US 2018/0345337 A1    Dec. 6, 2018

(30) Foreign Application Priority Data
Nov. 25, 2015    (CN) .......................... 2015 1 0828257

(51) Int. Cl.
*B09B 3/00*    (2006.01)
*C02F 11/02*    (2006.01)
(Continued)

(52) U.S. Cl.
CPC .............. *B09B 3/0016* (2013.01); *B09B 3/00* (2013.01); *B09B 3/0091* (2013.01); *C02F 11/02* (2013.01);
(Continued)

(58) Field of Classification Search
CPC ....... B09B 3/00; B09B 3/0016; B09B 3/0083; B09B 3/0091; C02F 11/00; C02F 11/02;
(Continued)

(56) References Cited

U.S. PATENT DOCUMENTS 8,524,929 B2 *    9/2013    Kale .................... C11B 3/008
                                                                         210/633

FOREIGN PATENT DOCUMENTS

CN    101168467 A    4/2008
CN    101503271 A    8/2009
(Continued)

OTHER PUBLICATIONS

Machine translation of CN 101168467 A, which is provided with the IDS filed on Jun. 1, 2018 and published Apr. 30, 2008 (Year: 2008).*
(Continued)

*Primary Examiner* — Natasha E Young
(74) *Attorney, Agent, or Firm* — Bayramoglu Law Offices LLC

(57) ABSTRACT

The present invention provides a method and apparatus for dewatering a biological solid material employing both microwave irradiation and solvent extraction. The method comprises microwave irradiation pretreatment, solvent extraction dewatering, solid-liquid separation, and solvent recovery. Through microwave irradiation of an aqueous biological solid material, gaps in the solid material are increased, and the biological material is fractured, thus releasing more bound water in the solid material. Subsequently, the microwave-irradiated biological solid material
(Continued)

is brought into full contact with an organic solvent, allowing the solvent to absorb and extract moisture from the solid, thus removing moisture from the solid. The aqueous solvent is then subjected to evaporation under reduced pressure or gasification under reduced pressure in a separation apparatus so as to separate the moisture and the solvent. The solvent is then compressed, condensed and recovered for recycling. Also provided is a device for implementing the dewatering method.

10 Claims, 5 Drawing Sheets

(51) Int. Cl.
  *C02F 11/12* (2019.01)
  *C02F 11/14* (2019.01)
(52) U.S. Cl.
  CPC .............. *C02F 11/12* (2013.01); *C02F 11/14* (2013.01); *C02F 2303/06* (2013.01)

(58) Field of Classification Search
  CPC ...... C02F 11/12; C02F 11/14; C02F 2303/00; C02F 2303/06
  See application file for complete search history.

(56) References Cited

FOREIGN PATENT DOCUMENTS

| | | |
|---|---|---|
| CN | 103819033 A | 5/2014 |
| CN | 105330124 A | 2/2016 |
| JP | 2007098383 A | 4/2007 |
| JP | 4923649 B2 | 4/2012 |

OTHER PUBLICATIONS

Renli Liang et al, Effect of microwave irradiation on sludge characteristic and dewaterability, Chinese Journal of Environmental Engineering, Jun. 2012, pp. 2087-2092, vol. 6, No. 6.
Chaolun Xiao et al, Effects of Microwave Irradiation on Penetration and Dewaterability of Dewatered Municipal Sludge, The Chinese Journal of Process Engineering, Apr. 2011, pp. 215-220, vol. 11, No. 2.

\* cited by examiner

METHOD AND APPARATUS FOR DEWATERING BIOLOGICAL SOLID MATERIAL EMPLOYING BOTH MICROWAVE IRRADIATION AND SOLVENT EXTRACTION

CROSS REFERENCE TO RELATED APPLICATIONS

This application is the national phase entry of International Application PCT/CN2016/103462, now WO/2017/088624, filed on Oct. 27, 2016, which is based upon and claims priority to Chinese Patent Application No. 201510828257.0, filed on Nov. 25, 2015, the entire contents of which are incorporated herein by reference.

TECHNICAL FIELD

The present invention relates to methods and systems for dewatering biological solid materials, and more particularly to a method and apparatus for dewatering a biological solid material employing both microwave irradiation and solvent extraction with low energy consumption.

BACKGROUND

A number of biological solid wastes or biological solid materials such as wastewater sludge, pharmacy fungi residues, algae residues, food industry residues, fermentation residues, coals with high moisture content, and agricultural residues are currently produced each year in China, with large productions. The production of only sludge from municipal sewage plants each year is 30 million tons, the annual emission of fungi residues of antibiotic byproducts reaches above 1.8 million tons, and the amount of algae residues is above 1 million tons. These biological solid wastes have high moisture content and large volume, and require dewatering treatment to reduce the volume.

Depending on different moisture removal manners, the dewatering method of biological solid materials may be divided into two main types: evaporative drying and non-evaporative dewatering.

Evaporative drying is to achieve drying of sludge by moisture evaporation, for example, anhydration drying. Anhydration is a treatment process for rapidly evaporating moisture in sludge with heat energy, and depending on the source of heat energy and the heating method, may be divided into fluidzing drying, superheated steam drying, dividing wall drying, infrared radiation drying, impinging stream drying, and so on. The advantages of anhydration drying technique are that during the drying, sludge is stable in properties, not easy to cohere and not easy to generate marsh gas, gases generated are nonflammable and less likely to explode, and the sludge moisture content after drying is lower than 10%. The disadvantages include large investment, high operation cost, and high technical demands in management and operation.

Non-evaporative dewatering mainly includes mechanical dewatering methods such as centrifugation and press filtration and non-conventional dewatering methods representative of solvent replacement. Mechanical dewatering uses a pressure difference between both sides of a filtering medium as a driving force such that moisture in a biological solid material is forced through the filtering medium to be removed in a liquid form. If the moisture content is decreased to 80% within a short time after sludge is subjected to mechanical dewatering, but is still high, subsequent treatment and disposal may be difficult. Thus, other deep dewatering or dewatering techniques are required for further dewatering.

Solvent extraction dewatering: the purpose is to not consume the latent heat of evaporation of water and not evaporate moisture in a biological solid material, moisture is transferred from sludge to a solvent by means of dissolution, absorption or exchange by mixing and interaction of the solvent and the sludge, and then the biological solid material is separated from the aqueous solvent and water is directly removed in a liquid state.

Microwave in treatment of a biological solid material can improve dewatering property and degradability of the biological solid material, and microwave in a liquid phase generates thermal effect and sonochemical effect that break floc, zooglea and cell bodies of the biological solid material such that bound water in the biological solid material is converted to free water. Microwave assisted solvent extraction dewatering method is efficient and stable, and has enormous application potential.

SUMMARY

Object of the invention: in order to solve the problems existing the prior art, the present invention provides a method for dewatering a biological solid material employing both microwave irradiation and solvent extraction with low energy consumption.

Another object of the present invention is to provide an apparatus for use with the above dewatering method.

Technical solution: in order to achieve the above objects, the present invention provides a method for dewatering a biological solid material employing both microwave irradiation and solvent extraction, comprising the following steps:

(A) microwave irradiation pretreatment: a biological solid material to be treated is subjected to microwave irradiation treatment;

(B) solvent extraction dewatering: the biological solid material subjected to microwave irradiation treatment in step (A) is contacted with an extraction dewatering solvent, such that moisture in the biological solid material is dissolved into the dewatering solvent;

(C) solid-liquid separation: the system obtained in step (B) is subjected to solid-liquid separation to obtain a dewatered biological solid material and a solvent-water mixture; and (D) solvent recovery: the solvent and the water in the solvent-water mixture obtained in step (C) are separated, and the solvent is recovered for reuse.

In step (A), the conditions of the microwave irradiation are: irradiation power 0.1 to 100000 W and irradiation time 0.1 to 600 min, more preferably, irradiation power 0.1 to 800 W and irradiation time 0.1 to 60 min.

In step (B), the dewatering solvent is an organic solvent that is gaseous at normal temperature and at normal pressure or easy to gasify (that is, an organic solvent that has a boiling point of less than 25° C. at normal temperature and at normal pressure, or an organic solvent that can gasify at normal pressure when heating at 25 to 99° C.) and is water-miscible in a liquefied state. Preferably, the organic solvent is any one of an alkyl solvent, an alcohol solvent, an aldehyde solvent, a ketone solvent, and an ether solvent, or a mixture thereof. More preferably, the alkyl solvent is any one of propane, butane, ethane, and isobutane, or a mixture thereof; the alcohol solvent is any one of methanol and ethanol, or a mixture thereof; the aldehyde solvent is any one of formaldehyde, acetaldehyde, propionaldehyde, and butyraldehyde, or a mixture thereof; the ketone solvent is for example, cyclopropenone; and the ether solvent is any one of ethyl propyl ether, diethyl ether, methyl ethyl ether, dimethyl ether, and ethyl methyl ether, or a mixture thereof. More preferably, the solvent is any one of butane, ethanol, formaldehyde, cyclopropenone, methyl ethyl ether, and dimethyl ether, or a mixture thereof.

In step (B), the solvent extraction dewatering is operated under the conditions of 0 to 99° C. and 0 to 10.0 MPa.

In step (C), the solid-liquid separation is filtration or centrifugation.

In step (D), the solvent and the water are separated by evaporation under reduced pressure, standing separation, centrifugal separation or distillation separation.

In step (A), the biological solid material to be treated is any one of a wastewater sludge, a river sediment, a lake sediment, a marine sediment, a pharmacy fungi residue, other industrial fungi residues, a river algae residue, a lake algae residue, a marine algae residue, a food industry residue, a fermentation residue, a coal with high moisture content, and anagricultural residue. Preferably, the biological solid material is subjected to mechanical dewatering such that the moisture content of the biological solid material is about 60 to 80 wt %, before dewatering (more specifically before microwave irradiation pretreatment).

The present invention further proposes an apparatus for dewatering a biological solid material, comprising a solvent storage unit, a dewatering reaction unit with a microwave generator, a solid-liquid separation unit, a gas-liquid separation unit, a gas liquefaction unit, and a solvent recovery unit, connected in series sequentially in order;

wherein, the solvent storage unit is a solvent reservoir;

the dewatering reaction unit is a dewatering reactor provided with a microwave energy output stick and a stirring device therein, the microwave energy output stick being controlled by the microwave generator;

the solid-liquid separation unit is a filtration separation device, a standing separation reservoir or a centrifuge;

the gas-liquid separation unit is a gas-liquid separator and a dryer, connected in series; and the gas liquefaction unit is an air compressor and a solvent recovery condenser, connected in series.

The dewatering reaction unit and the solid-liquid separation unit may be separately provided and connected in series, and, for example, connected in series to the extraction dewatering reactor using a standing separation device or a centrifugal separation device, so as to achieve continuous mass production. Alternatively, the extraction dewatering reaction unit is coupled to the solid-liquid separation unit, that is, filter screens are provided at the upper part and the bottom part within an interior space of the dewatering reactor. The filter screens are movable and removable. When the upper filter screen is opened, a solid material can be added to the extraction dewatering reaction unit. When the upper filter screen is closed, the extraction dewatering reaction of the solid material in the dewatering reaction unit by employing both microwave irradiation and solvent extraction is achieved. The liquid portion directly enters the gas-liquid separation unit through the bottom filter screen. When being clogged, the bottom filter screen can be cleaned on line or directly replaced.

A heating ring is provided on an outer wall of the gas-liquid separator. For a solvent substance that is liquid at normal temperature and at normal pressure but easy to gasify, the gas-liquid separator is electrically heated such that the solvent substance is heated and gasified to be separated from water.

The extraction dewatering reactor with a microwave generator is used for microwave irradiation pretreatment of a biological solid material firstly, such that bound water in the biological solid material is released as free water that is easy to remove. Then, the extraction solvent is mixed and contacted with the biological solid material such that moisture in the biological solid material is dissolved into the dewatering solvent so as to achieve dewatering of the biological solid material. By providing mechanical stirring in the dewatering reactor, the dewatering reaction can be made more complete, and by providing filter screens in upper and bottom in the extraction dewatering reactor, loss of the biological solid material with the solution from the dewatering reactor can be avoided. The gas-liquid separator is mainly used to separate the solvent and the water. For a solvent substance that is gaseous at normal temperature and at normal pressure, the gas-liquid separator is used as an evaporator for gasification under reduced pressure of a liquefied substance of the solvent substance with moisture in a biological solid material dissolved therein and as a separator for separation of the gasified solvent substance and water. For a solvent substance that is liquid at normal temperature and at normal pressure but easy to gasify, the gas-liquid separator is used for heating and evaporation under reduced pressure of a solvent substance that is liquid, and as a separator for separation of the gasified solvent substance and water.

Principle of the invention: a biological solid waste is subjected to microwave irradiation with a certain power for a certain time; then, using an organic solvent that is gaseous at normal temperature and at normal pressure or easy to gasify and is water-miscible in a liquefied state as a dewatering solvent (hereafter referred to as dewatering solvent), a liquefied substance of the solvent substance is contacted with sludge in a dewatering apparatus, such that moisture in the sludge is dissolved into the liquefied substance of the solvent substance so as to remove moisture in the sludge; and further, the solvent substance in the liquefied substance of the aqueous dewatering solvent is gasified by evaporation under reduced pressure such that water is separated from a gas of the dewatering solvent, and the gas of the dewatering solvent is recovered and liquefied by way of pressure cooling for recycling.

Advantageous effect: the present invention has the following advantages, compared to the prior art:

(1) a biological solid material is subjected to microwave pretreatment firstly, which not only improves the dewatering property of the biological solid material, but also reduces the moisture content of the biological solid material, improving the dewatering effect of the biological solid material by the liquefied substance;

(2) an easily liquefiable substance is used as a dewatering medium, moisture is removed without moisture evaporation, and recovery of latent heat of evaporation is not required at all, so that dewatering can be performed at an operation temperature that is close to atmospheric temperature without the need for recovering latent heat of evaporation of moisture, thereby saving the energy; and (3) in addition, for the substance that is gaseous at normal temperature and at normal pressure, separation of the liquefied substance and the moisture is easy such that dewatering is achieved with less energy. The present invention uses both microwave irradiation and solvent extraction to remove moisture in a biological solid material, which not only has high dewatering efficiency but also can save the energy; and thus, has wide application prospects in treatment and disposal of municipal sludge.

BRIEF DESCRIPTION OF THE DRAWINGS

FIG. 8 shows an apparatus for dewatering a biological solid material employing both microwave irradiation and solvent extraction according to the present invention and a corresponding schematic flow chart, in which:

Figure 9:
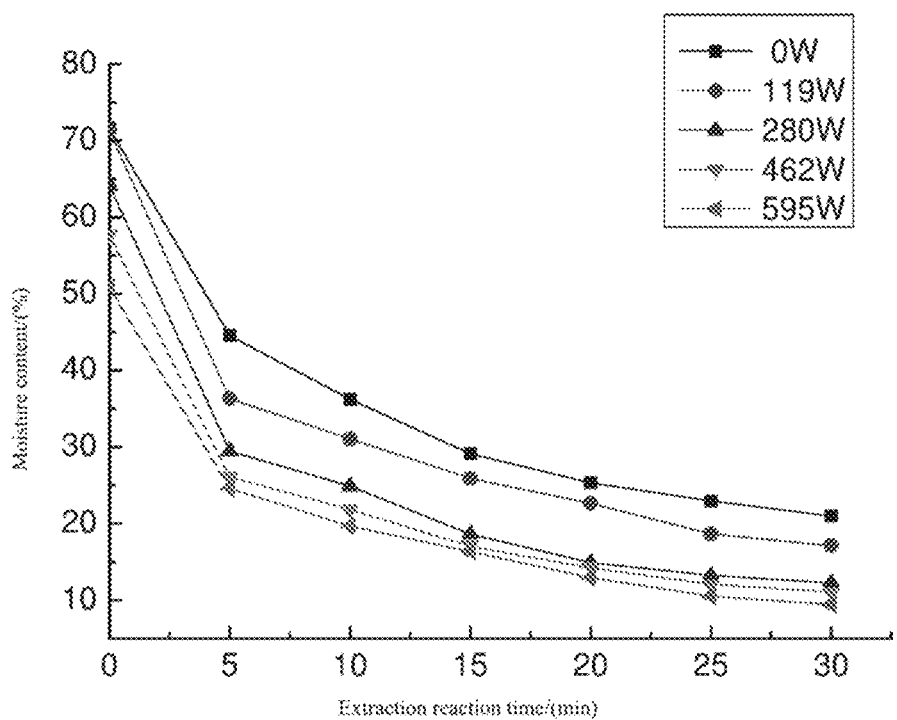
Figure 10:
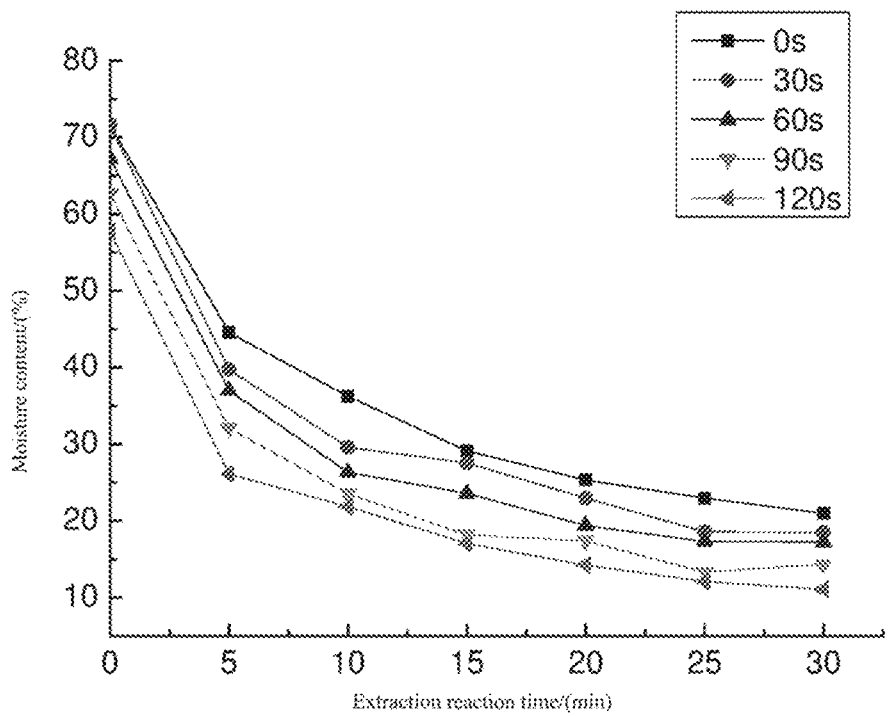

1-solvent cylinder; 2-solvent reservoir; 3-dewatering reactor; 4-microwave generator; 5-gas-liquid separator; 6-dryer; 7-air compressor; 8-solvent recovery condenser; 9-microwave energy output stick;

FIG. 9 shows the effect of microwave irradiation power and extraction reaction time on sludge moisture content after dewatering; and FIG. 10 shows the effect of microwave irradiation time and extraction reaction time on sludge moisture content after dewatering.

DETAILED DESCRIPTION OF THE EMBODIMENTS

The present invention proposes a method for dewatering a biological solid material employing both microwave irradiation and solvent extraction. Firstly, the present invention investigates the effect of microwave treatment (including microwave power and microwave irradiation time) on the properties of a biological solid material, taking sludge as an example.

(1) Effect of Microwave Time on Sludge Temperature and Moisture Content

The change law of temperature and moisture content of a sludge sample at a certain microwave power is investigated. The determination results of the experiments are shown in Table 1.

TABLE 1

Effect of microwave time on sludge temperature and moisture content

|  | Microwave time (S) | | | | |
| --- | --- | --- | --- | --- | --- |
|  | 0 | 30 | 60 | 90 | 120 |
| Temperature (° C.) | 16 | 66 | 95 | 95 | 95 |
| Moisture content (%) | 71.6 | 71.5 | 67.3 | 62.7 | 57.7 |

As shown in Table 1, the temperature of the sludge sample rises very rapidly for first 60 s, from original 16° C. to 95° C.; and then as the microwave time increases, the temperature of the sludge sample remains constant at 95° C. The change in moisture content of the sludge sample is small, only from 71.6% down to 71.5% for first 30 s; and then the sludge moisture content starts to decrease rapidly, and is reduced to 57.7% at 120 s.

The microwave irradiation results in increase in sludge temperature and decrease in moisture content, mainly due to thermal effect of microwave, that is, substances in sludge having a permanent dipole and an induced dipole can absorb microwave energy. At the begin of the experiments, the temperature of the sludge sample is low, microwave energy is used to raise the temperature, there is little evaporation of moisture and there is little decrease in moisture content of the sludge sample; as the microwave irradiation time further increases, the sludge temperature constantly rises, a large amount of moisture in sludge starts to be evaporated and the sludge moisture content is rapidly reduced; and at 60 s of the microwave irradiation, the sludge temperature reaches 95° C., and in this phase, the sludge moisture content is reduced at the most rapid rate. (2) Effect of microwave power on sludge temperature and moisture content The change law of temperature and moisture content a sludge sample at various microwave powers is investigated. The determination results of the experiments are Table 2.

TABLE 2

Effect of microwave power on sludge temperature and moisture content

|  | Microwave power (W) | | | | |
| --- | --- | --- | --- | --- | --- |
|  | 0 | 119 | 280 | 462 | 595 |
| Temperature (° C.) | 16 | 75 | 95 | 95 | 95 |
| Moisture content (%) | 71.6 | 71.3 | 64.2 | 57.7 | 50.9 |

As shown in Table 2, for a certain time, the more the power is, the more the decrease in sludge moisture content is, and the more significant the increase in temperature is.

Microwave irradiation can reduce the sludge moisture content mainly due to thermal effect of microwave, and sludge absorbs microwave energy such that the sludge temperature is raised so as to accelerate evaporation of moisture. Evaporation of moisture requires transmission and diffusion of water inside the sludge to the surface of the sludge before evaporation, and therefore, the sludge moisture content is initially decreased in a slow rate. The characteristics of microwave heating result in high temperature inside the sludge so as to accelerate the rate of diffusion of water inside the sludge to the surface such that the sludge moisture content is greatly decreased. Therefore, when the sludge reaches a certain temperature, the sludge moisture content is rapidly decreased. Absorption of microwave energy by a unit mass of the sludge is limited, and when the microwave power is too large, excessive microwave energy will be lost. Therefore, for the same microwave energy, a combination of low power and long time is superior to a combination of high power and short time.

(3) Effect of Microwave Irradiation Time on Extracellular Polymer Substances (EPSs) in Sludge:

A sludge sample is treated with different microwave irradiation times respectively. Several grams of 5 samples are respectively weighted and placed in breakers, 25 ml distilled water is added, and the mixture is stirred to be uniform with a glass rod. Sludge samples having a moisture content of 97% are obtained, and determined for the content of extracellular polymer substances (EPSs). The experimental results are shown in FIG. 1.

Figure 1:
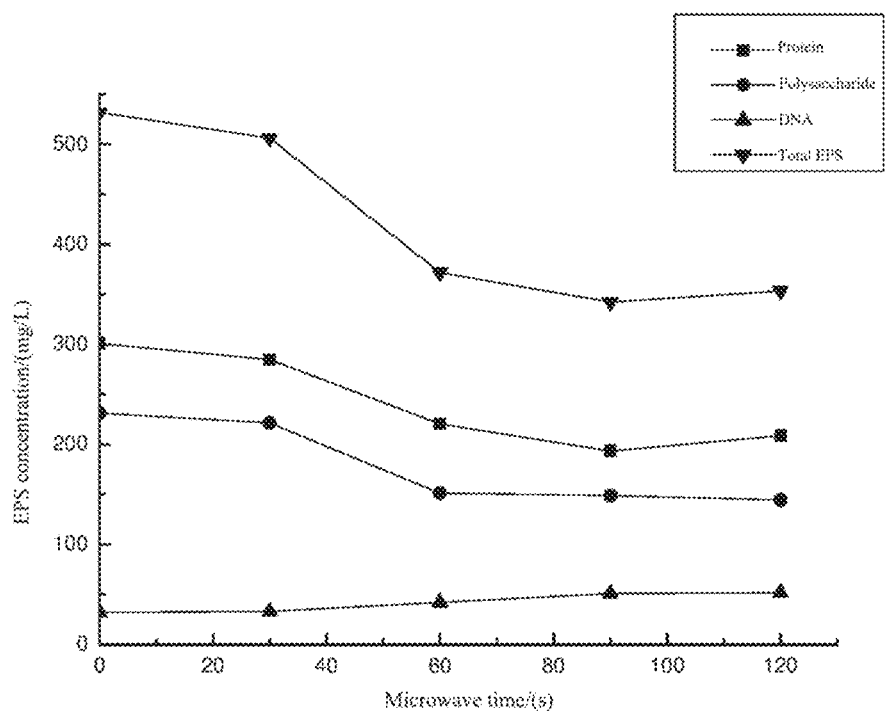
FIG. 1 is a schematic diagram showing the effect of microwave irradiation time on extracellular polymer substances (EPSs) in sludge.

It can be found from FIG. 1 that with increase of microwave irradiation time, the amounts of proteins, polysaccharides and total EPSs in the sludge samples decrease and then tend to be stable. The amounts of proteins, polysaccharides and EPSs reach the lowest values at 90 s of microwave time, respectively, from 300.7 mg/l down to 193.3 mg/l, from 231.3 mg/l down to 148.9 mg/l, and from 532.0 mg/l down to 371.8 mg/l, and then, each remain essentially unchanged. DNA content remains stable at about 32.0 mg/l before 60 s, and then begins to increase, and is raised to 51.0 mg/l at 90 s.

The action of microwave on the sludge samples is divided into thermal effect and non-thermal effect. Initially, sludge absorbs little microwave energy, the sludge temperature is not high, and the EPS structure is less destroyed. The non-thermal effect of microwave results in an oriented arrangement of polarized portions of bio-macromolecules in sludge colloids, leading to breakage of secondary bonds, damage to the colloid structure, and release of EPSs in sludge; and with increase of microwave time, the temperature rises to the boiling point, the action force generated by the temperature gradient results in damage to the EPS structure, release of proteins and polysaccharides in EPSs, and degradation of EPSs. The EPS amount reaches the lowest value at 90 s, and the amounts of proteins, polysaccharides and total EPSs in the sludge are decreased by 35.7%, 35.6% and 35.7% respectively. Subsequently, since most of the sludge colloids have been damaged, degradation of EPSs ends and the amounts of proteins, polysaccharides and EPSs remain unchanged.

(4) Effect of Microwave Power on Extracellular Polymer Substances in Sludge (Sludge EPSs)

Figure 2:
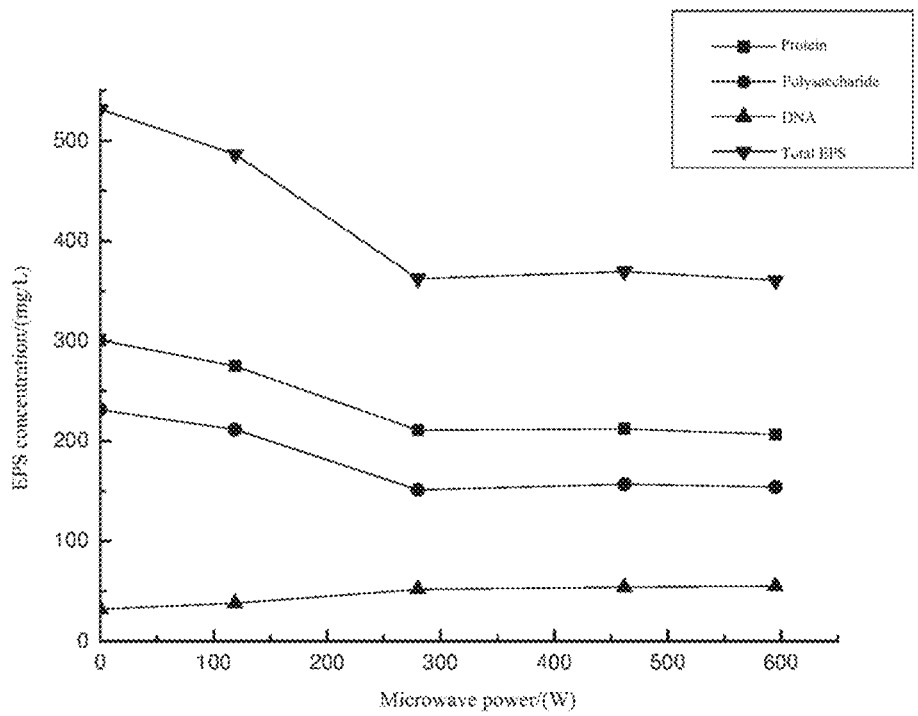
FIG. 2 is a schematic diagram showing the effect of microwave power on extracellular polymer substances (EPSs) in sludge.

A sludge sample is treated with different microwave irradiation powers respectively. Several grams of 5 samples are respectively weighted and placed in breakers, 25 ml distilled water is added, and the mixture is stirred to be uniform with a glass rod. Sludge samples having a moisture content of 97% are obtained, and determined for the content of EPSs. The experimental results are shown in FIG. 2.

It can be found from the figure that, for a certain microwave time, the amounts of proteins, polysaccharides and total EPSs in the sludge decrease at first and then tend to be stable with increase of microwave power, reach the lowest values 210.9 mg/1, 151.3 mg/l and 362.2 mg/l respectively at 280 W, and after that, each remain stable with increase of microwave power.

Figure 3:
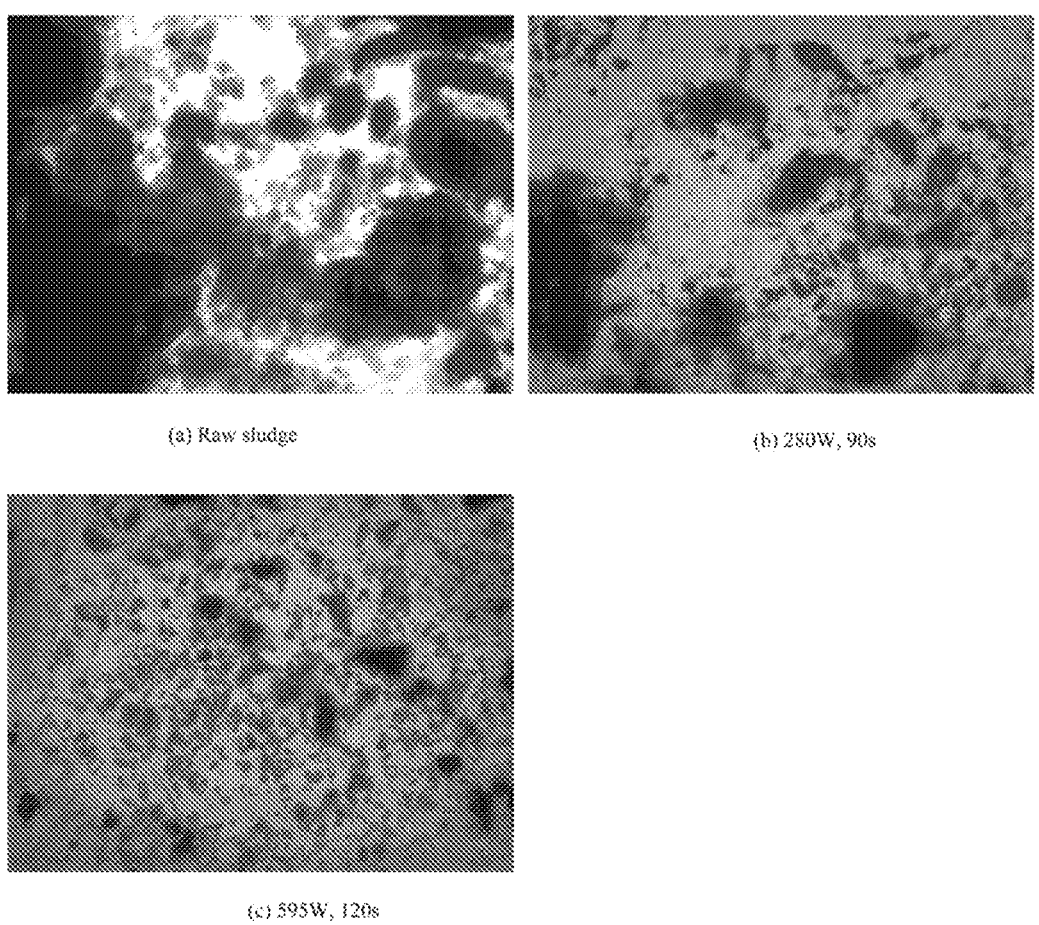
FIG. 3 is a microscopy picture of sludge after microwave pretreatment: (a) for raw sludge, (b) for sludge with microwave treatment at 280 W for 90 s, and (c) for sludge with microwave treatment at 595 W for 120 s.

(5) Effect of microwave pretreatment on floc structure in sludge 2 parts of 20 g sludge are weighted, subjected to microwave treatment at 280 W for 90 s and 595 W for 120 s respectively, stirred with a glass bar for 1 min, magnetically stirred for 3 min, and observed with a microscope, as shown in FIG. 3. It can be found from the figure that, with increase of microwave energy, the size of sludge decreases, gaps between the particles of sludge increase, and the sludge floc is damaged.

Figure 4:
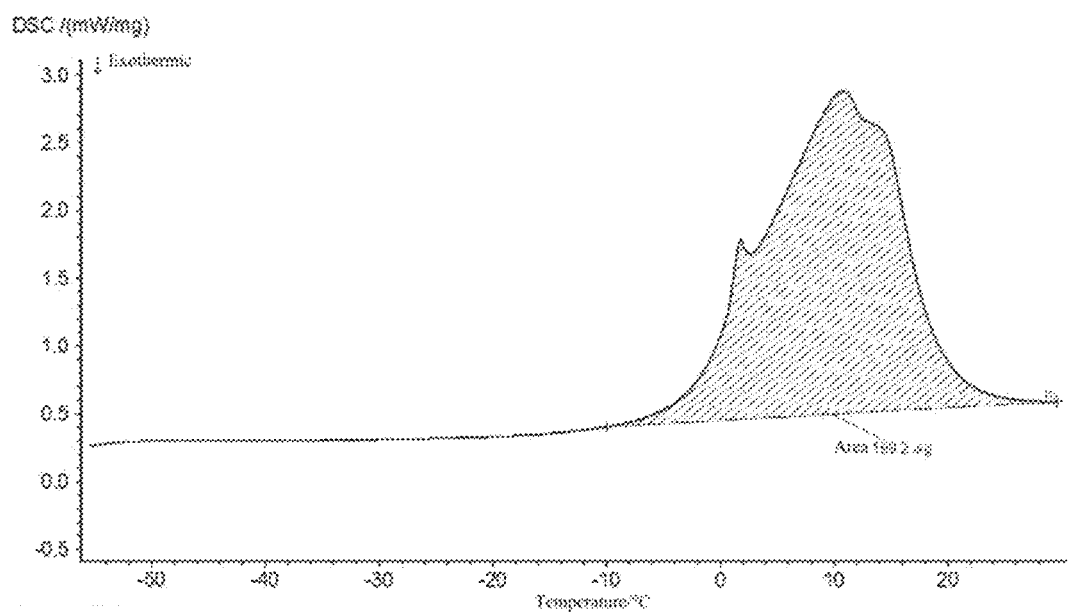
FIG. 4 is a differential scanning calorimetry (DSC) thermogram for raw sludge.
Figure 5:
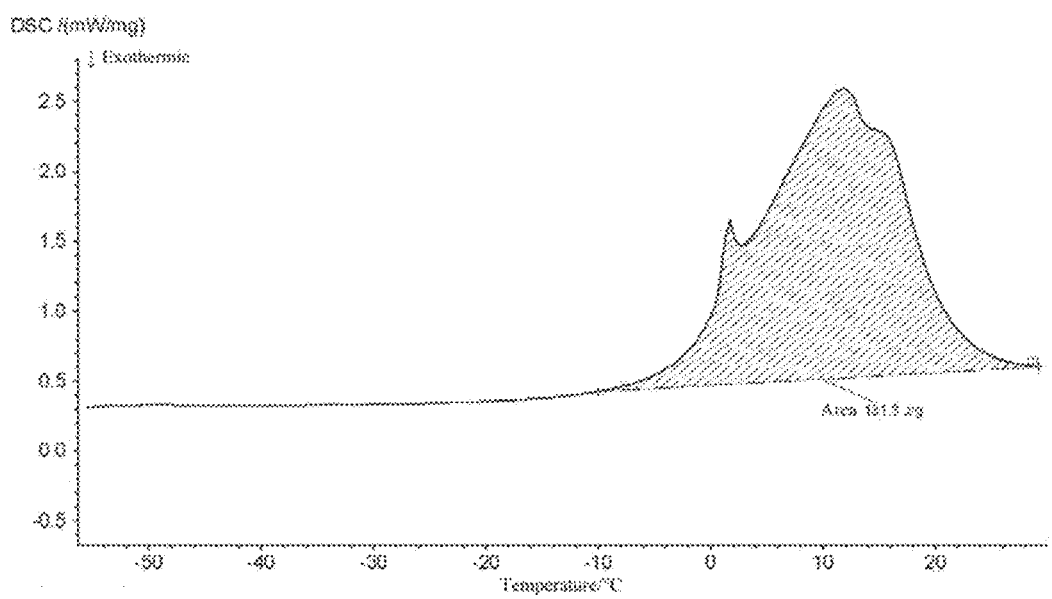
FIG. 5 is a differential scanning calorimetry (DSC) thermogram for sludge with microwave treatment at 280 W for 90 s.
Figure 6:
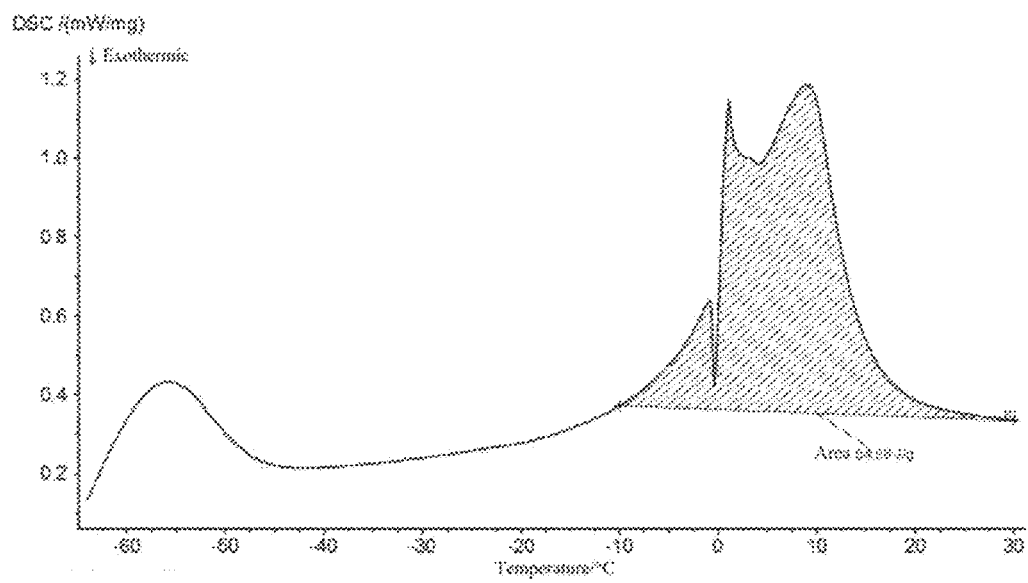
FIG. 6 is a differential scanning calorimetry (DSC) thermogram for sludge with microwave treatment at 595 W for 120 s.

(6) Effect of microwave pretreatment on bound water in sludge 2 parts of 20 g sludge are weighted, subjected to microwave treatment at 280 W for 90 s and 595 W for 120 s respectively, and determined by a differential scanning calorimeter (DSC). The determination results are shown in the figures. FIG. 4 is a DSC thermogram for raw sludge, FIG. 5 is a DSC thermogram for sludge with microwave treatment at 280 W for 90 s, and FIG. 6 is a DSC thermogram for sludge with microwave treatment at 595 W for 120 s.

Figure 7:
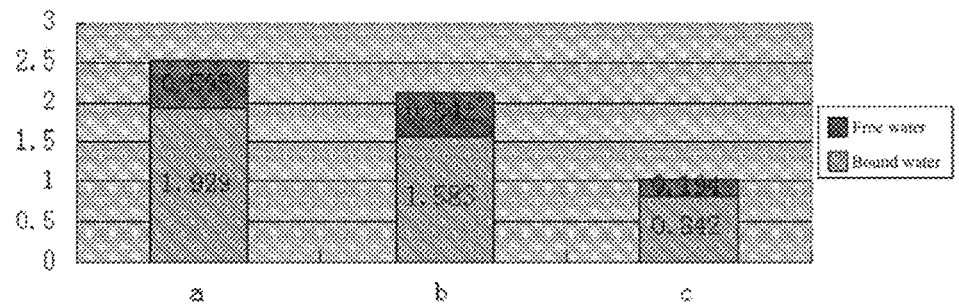
FIG. 7 is a schematic diagram showing mass change of moisture in sludge after microwave pretreatment: a. for raw sludge, b. for sludge with microwave irradiation at a microwave power of 280 W for 90 s, and c. for sludge with microwave irradiation at a microwave power of 595 W for 120 s.

It can be found from the FIG. 7 that, microwave pretreatment can reduce various water contents in sludge. For microwave treatment at 280 W for 90 s, the content of free water in sludge is not significantly changed, and is decreased by 8.9% from 0.595 g·g−1 down to 0.542 g·g−1, while the content of bound water in sludge is significantly changed, and is decreased by 17.9% from 1.929 g·g−1 down to 1.583 g·g−1. This is possibly because under this microwave condition, sludge is being in a temperature rising phase, the sludge temperature is not high, and moisture is evaporated slowly, and thus the change of free water is not significant. At the same time, microwave energy destroys the colloid structure of sludge, so that bound water exudes from the sludge colloids and becomes free water, resulting in decrease in the content of bound water. For microwave treatment at 595 W for 120 s, various water contents in sludge are rapidly decreased. Free water content decreases from 0.595 g·g−1 to 0.194 g·g−1, and bound water content decreases from 1.929 g·g−1 to 0.842 g·g−1.

Sum up, microwave can rapidly increase the sludge temperature and decrease the sludge moisture content. In an initial phase, the sludge temperature rapidly increases and the sludge moisture content slowly decreases; once the sludge temperature reaches the maximum, the temperature remains unchanged and the sludge moisture content rapidly decreases. Microwave pretreatment can improve the dewatering property of sludge. The mechanism is possibly that co-action of thermal effect and non-thermal effect of microwave results in damage to the sludge colloids and decrease in bound water. For a certain microwave power, with increase of microwave irradiation time, total EPS amount in sludge decreases at first and then tends to be stable, and specific resistance of sludge decreases at first and then increases. For a certain microwave time, with increase of microwave power, total EPS amount in sludge decreases at first and then tends to be stable, and specific resistance of sludge decreases at first and then increases. Microwave pretreatment can rapidly reduce the contents of bound water and free water in sludge.

Figure 8:
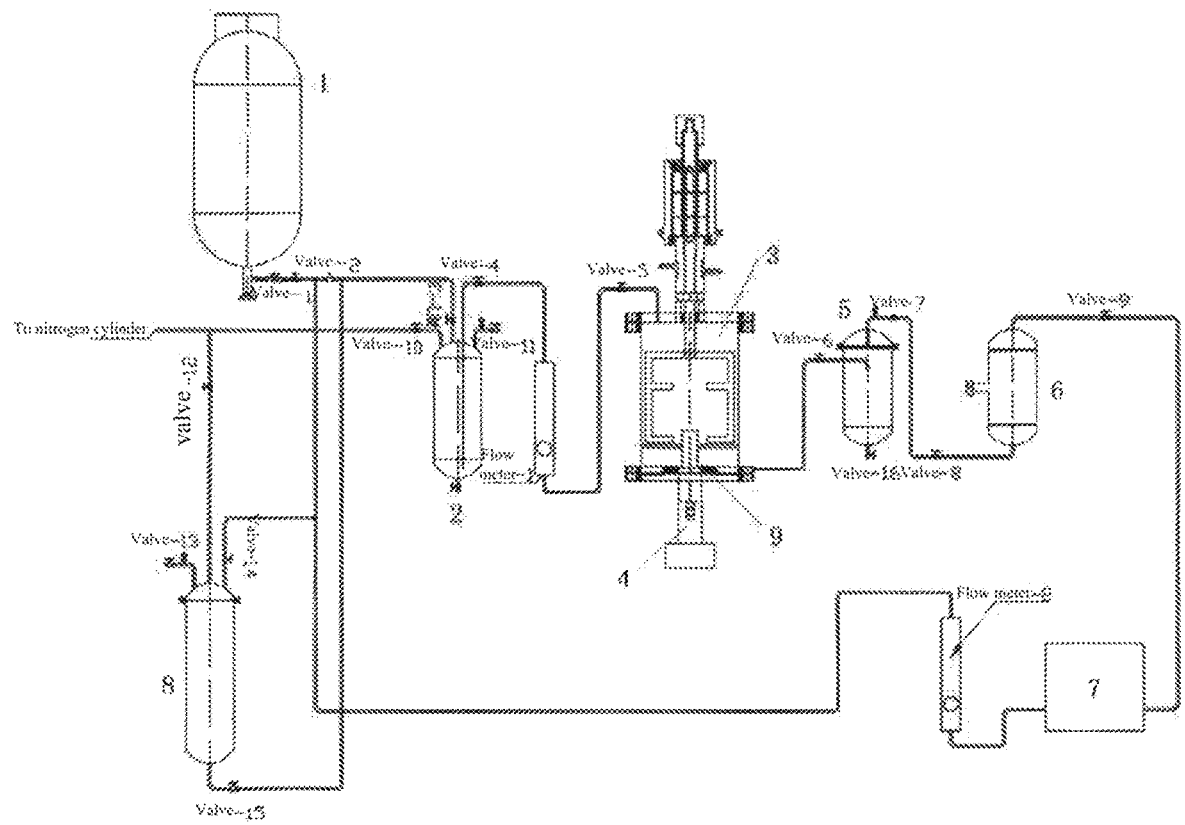

Based on the effect of the microwave treatment on the properties and dewatering property of a biological solid as described above, the present invention proposes a dewatering method employing both microwave irradiation and solvent extraction. As shown in FIG. 8, an apparatus for dewatering a biological solid material comprises a solvent storage unit, a dewatering reaction unit with a microwave generator, a solid-liquid separation unit, a gas-liquid separation unit, a gas liquefaction unit, and a solvent recovery unit, connected in series sequentially in order.

Herein, the solvent storage unit is a solvent reservoir 2. The solvent in the solvent reservoir 2 is supplied from a solvent recovery condenser 8.

The dewatering reaction unit is a dewatering reactor 3 provided with a microwave energy output stick 9 and a stirring device therein, the microwave energy output stick 9 being controlled by the microwave generator 4 for outputting of microwave.

The solid-liquid separation unit is a filtration separation device, a standing separation reservoir or a centrifuge. The dewatering reaction unit and the solid-liquid separation unit may be separately provided and connected in series, and, for example, connected in series to the dewatering reactor using a standing separation device or a centrifugal separation device, so as to achieve continuous mass production. Alternatively, the dewatering reaction unit is coupled to the solid-liquid separation unit, that is, filter screens are provided at an upper part and at the bottom within an interior space of the dewatering reactor. The filter screens are movable and removable. When the upper filter screen is opened, a solid material can be added to the dewatering reaction unit. When the upper filter screen is closed, the dewatering reaction of the solid material in the dewatering reaction unit by employing both microwave irradiation and solvent extraction is achieved. The liquid portion directly enters the gas-liquid separation unit through the bottom filter screen. When being clogged, the lower filter screen can be cleaned on line or directly replaced.

The gas-liquid separation unit is a gas-liquid separator 5 and a dryer 6, connected in series; and a heating ring is provided on an outer wall of the gas-liquid separator 5. For a solvent substance that is liquid at normal temperature and at normal pressure but easy to gasify, the gas-liquid separator is electrically heated such that the solvent substance is heated and gasified to be separated from water.

The gas liquefaction unit is an air compressor 7 and a solvent recovery condenser 8, connected in series.

The solvent recovery condenser 8 is connected to both the solvent cylinder 1 and the air compressor 7.

A valve is provided between every two components, as shown by valves 1 to 14 in FIG. 8. A flow meter is provided between the solvent reservoir 2 and the extraction dewatering reactor 3 and after the air compressor 7.

Dewatering process: according to the present invention, a biological solid material to be dewatered is subjected to microwave treatment by the dewatering reactor 3 with a microwave generator at first, whereby, on one hand, the temperature of the biological solid material is increased and, on the other hand, water that is difficult to remove (bound water) in the biological solid material is removed; and then, using a dewatering solvent, the removed water is dissolved in the dewatering solvent, wherein a solvent that is highly water-miscible in a liquefied state is selected as a dewatering solvent. After that, the dewatering solvent with water dissolved therein is separated from the biological solid material; and then the gas-liquid separator 5 is used to separate the water and the dewatering solvent, wherein the separated dewatering solvent further passes through the dryer 6, the air compressor 7 to be compressed, and the solvent recovery condenser 8 to be liquefied, for recycling.

During the process of dewatering operation, in order to reduce dewatering time and solvent amount, the biological solid material is pretreated with microwave. Considering consumption of energy by microwave and efficiency of microwave absorption by the biological solid material, it is preferred to use a combination of low power and long time as microwave condition.

In order to reduce energy consumption during the dewatering process, the boiling point of the solvent is preferably near or at normal temperature. Thus, in the present invention, preferably, a material that is gas at 25° C. and 1 atm or a material that is easy to gasify after heating is selected, and one of isobutane, butane, ethane, methanol, ethanol, formaldehyde, acetaldehyde, propionaldehyde, butyraldehyde, cyclopropenone, ethyl propyl ether, diethyl ether, methyl ethyl ether, dimethyl ether, and ethyl methyl ether, or a mixture thereof may be selected.

The present invention is described in detail below by way of specific examples.

Example 1

In this example, dimethyl ether that is gas at 25° C. and 1 atm was used, and a mechanically dewatered sludge was used as sludge to be dewatered, and had a sludge moisture content of 71.6 wt % after mechanical dewatering. Following the solvent dewatering method and principle for sludge as described in the front part, 40 g of the mechanically dewatered sludge was placed in a dewatering reactor 3 with a microwave generator 4, microwave power and time were set for microwave pretreatment, and after the microwave pretreatment was completed, a switch of the microwave generator was turned off such that sludge was cooled to room temperature. A solvent cylinder 1 was opened, and a gaseous dewatering solvent was flowed to a condenser 8 (temperature −25° C., 0.1 MPa), and cooled down to be liquefied as liquid dewatering solvent. A valve of a high-pressure nitrogen cylinder was opened, the liquid dewatering solvent was flowed into a solvent reservoir 2, and the flow of the dewatering solvent was controlled by a flow meter. The liquid dewatering solvent flowed to the dewatering reactor 3 (temperature: room temperature, 0.6 MPa), where the liquid dewatering solvent was contacted with the sludge to be dewatered, and moisture in the sludge entered the liquid dewatering solvent. A valve was opened, and the dewatering solvent with moisture dissolved therein flowed out of the dewatering reactor 3 into a gas-liquid separator 5. Due to increase in the temperature of the liquid dewatering solvent and decrease in the ambient pressure, the liquid dewatering solvent was gasified, and moisture remained in a liquefied state and was left in the gas-liquid separator 5. The gasified dewatering solvent was passed to a dryer 6, where the dewatering solvent was dried. The dried dewatering solvent was pressurized through an air compressor 7 and flowed into the solvent recovery condenser 8 or the solvent cylinder 1 for reuse.

The above process was performed at room temperature, the microwave power was selected as 0, 119 W, 280 W, 462 W, and 595 W, respectively, and the microwave time for the pretreatment was 120 s. After the microwave irradiation was completed, the switch of the microwave generator was turned off. A stirring speed within the dewatering reactor was 50 rad/min, the liquid dewatering solvent used in the experiments had a purity of above 99%, and the contact time between the liquid dewatering solvent and the sludge (i.e., extraction time) was selected as 0, 5 min, 10 min, 15 min, 20 min, 25 min, and 30 min, respectively.

The mechanically dewatered sludge having a moisture content of 71.6% had the following sludge moisture contents as shown in Table 3 after the above dewatering.

After the sludge was subjected to microwave irradiation, the sludge temperature was increased and the moisture content was slightly decreased, and then extraction dewatering was performed with solvent DME. The effect of microwave irradiation power and extraction reaction time on sludge moisture content after dewatering is shown in FIG. 9, where the sludge moisture content after extraction dewatering gradually decreases with increase of microwave irradiation power and increase of solvent extraction reaction time.

TABLE 3

Effect of microwave irradiation power on sludge moisture content after extraction dewatering

| Extraction time (min) | Microwave power (W) | | | | |
|---|---|---|---|---|---|
| | 0 | 119 | 280 | 462 | 595 |
| | Sludge moisture content (%) | | | | |
| 0 | 71.6 | 71.3 | 64.2 | 57.7 | 50.9 |
| 5 | 44.5 | 36.3 | 29.4 | 26.1 | 24.6 |
| 10 | 36.2 | 31.1 | 24.9 | 21.9 | 19.7 |
| 15 | 29.1 | 25.9 | 18.6 | 17.1 | 16.4 |
| 20 | 25.3 | 22.6 | 14.9 | 14.2 | 12.9 |
| 25 | 22.9 | 18.7 | 13.2 | 12.1 | 10.5 |
| 30 | 21.0 | 17.1 | 12.3 | 11.1 | 9.4 |

Example 2

In this example, dimethyl ether that is gas at 25° C. and 1 atm was used, and a mechanically dewatered sludge was used as sludge to be dewatered, and had a sludge moisture content of 71.6% after mechanical dewatering. Following the solvent dewatering method and principle for sludge as described in the front part, 40 g of the mechanically dewatered sludge was placed in a dewatering reactor 3 with a microwave generator 4, where microwave power and time were set for microwave pretreatment, and sludge was cooled to room temperature. A solvent cylinder 1 was opened, and a gaseous dewatering solvent was flowed to a condenser 8 (temperature −25° C., 0.1 MPa), and cooled down to be liquefied as liquid dewatering solvent. A valve of a high-pressure nitrogen cylinder was opened, the liquid dewatering solvent was flowed into a solvent reservoir 2, and the flow of the dewatering solvent was controlled by a flow meter. The liquid dewatering solvent flowed to the dewatering reactor 3 (temperature: room temperature, 0.6 MPa), where the liquid dewatering solvent was contacted with the sludge to be dewatered, and moisture in the sludge entered the liquid dewatering solvent. A valve was opened, and the dewatering solvent with moisture dissolved therein flowed out of the dewatering reactor 3 into a gas-liquid separator 5. Due to increase in the temperature of the liquid dewatering solvent and decrease in the ambient pressure, the liquid dewatering solvent was gasified, and moisture remained in a liquefied state and was left in the gas-liquid separator 5. The gasified dewatering solvent was passed to a dryer 6, where the dewatering solvent was dried. The dried dewatering solvent was pressurized through an air compressor 7 and flowed into the solvent recovery condenser 8 or the solvent cylinder 1 for reuse.

The above process was performed at room temperature, the stirring speed was 50 rad/min, the liquid dewatering solvent used in the experiments had a purity of above 99%, the microwave time was 0, 30 s, 60 s, 90 s, and 120 s, respectively, and the microwave power was 462 W. The contact time between the liquid dewatering solvent and the sludge was set as 0, 5 min, 10 min, 15 min, 20 min, 25 min, and 30 min respectively.

The mechanically dewatered sludge having a moisture content of 71.6% had the following sludge moisture contents as shown in Table 4 after the above dewatering.

TABLE 4

Effect of microwave irradiation time and extraction contact time on sludge moisture content after extraction dewatering

| Extraction time (min) | Microwave time (S) | | | | |
|---|---|---|---|---|---|
| | 0 | 30 | 60 | 90 | 120 |
| | Sludge moisture content (%) | | | | |
| 0 | 71.6 | 71.5 | 67.3 | 62.7 | 57.7 |
| 5 | 44.5 | 39.7 | 37.0 | 32.1 | 26.1 |
| 10 | 36.2 | 29.6 | 26.3 | 23.6 | 21.9 |
| 15 | 29.1 | 27.5 | 23.6 | 18.13 | 17.1 |
| 20 | 25.3 | 23.0 | 19.4 | 17.4 | 14.2 |
| 25 | 22.9 | 18.6 | 17.3 | 13.3 | 12.1 |
| 30 | 21.0 | 18.4 | 17.2 | 14.4 | 11.1 |

After the sludge was subjected to microwave irradiation, the sludge temperature was increased and the moisture content was slightly decreased, and then extraction dewatering was performed with solvent DME. The effect of microwave irradiation time and extraction reaction time on sludge moisture content after dewatering is shown in FIG. 10, where the sludge moisture content after extraction dewatering gradually decreases with increase of microwave irradiation time and increase of solvent extraction reaction time.

Example 3

In this example, dimethyl ether that is gas at 25° C. and 1 atm was used as dewatering solvent, and a mechanically dewatered sludge was used as biological solid material to be dewatered, and had a sludge moisture content of 71.6% after mechanical dewatering. Following the solvent dewatering method and principle for sludge as described in the front part, 40 g of the mechanically dewatered sludge was placed in a dewatering reactor 3 with a microwave generator 4, where microwave power and time were set for microwave pretreatment. A solvent cylinder 1 was opened, and a gaseous dewatering solvent was flowed to a condenser 8 (temperature −25° C., 0.1 MPa), and cooled down to be liquefied as liquid dewatering solvent. A valve of a high-pressure nitrogen cylinder was opened, the liquid dewatering solvent was flowed into a solvent reservoir 2, and the flow of the dewatering solvent was controlled by a flow meter. The liquid dewatering solvent flowed to the dewatering reactor 3 (temperature: room temperature, 0.6 MPa), where the liquid dewatering solvent was contacted with the sludge to be dewatered, and moisture in the sludge entered the liquid dewatering solvent. A valve was opened, and the dewatering solvent with moisture dissolved therein flowed out of the dewatering reactor 3 into a gas-liquid separator 5. Due to increase in the temperature of the liquid dewatering solvent and decrease in the ambient pressure, the liquid dewatering solvent was gasified, and moisture remained in a liquefied state and was left in the gas-liquid separator 5. The gasified dewatering solvent was passed to a dryer 6, where the dewatering solvent was dried. The dried dewatering solvent was pressurized through an air compressor 7 and flowed into the solvent recovery condenser 8 or the solvent cylinder 1 for reuse.

The above process was performed at room temperature, the microwave power was 280 W and the microwave time was 120 s for the pretreatment, the dewatering solvent and the sludge had a liquid to solid ratio of 25 mL/g, the stirring speed was 50 rad/min, and the contact time between the liquid dewatering solvent and the sludge (i.e., extraction time) was 30 min. The mechanically dewatered sludge having a moisture content of 71.6% had a decreased moisture content of 12.3% after the above dewatering.

Example 4

In this example, formaldehyde was used as dewatering solvent, and an algae residue was used as biological solid material to be dewatered, and had a moisture content of 79.1%. Following the solvent dewatering method and principle for sludge, 40 g of the algae residue was placed in a dewatering reactor 3 with a microwave generator 4, where microwave power and time were set for microwave pretreatment. A solvent cylinder 1 was opened, and a dewatering solvent was flowed to a condenser 8 (temperature −25° C., 0.1 MPa), and cooled down to be liquefied as liquid dewatering solvent. A valve of a high-pressure nitrogen cylinder was opened, the liquid dewatering solvent was flowed into a solvent reservoir 2, and the flow of the dewatering solvent was controlled by a flow meter. The liquid dewatering solvent flowed to the dewatering reactor 3 (temperature: room temperature, 0.6 MPa), where the liquid dewatering solvent was contacted with the algae residue to be dewatered, and moisture in the algae residue entered the liquid dewatering solvent. A valve was opened, and the dewatering solvent with moisture dissolved therein flowed out of the dewatering reactor 3 into a gas-liquid separator 5. Due to increase in the temperature of the liquid dewatering solvent and decrease in the ambient pressure, the liquid dewatering solvent was gasified, and moisture remained in a liquefied state and was left in the gas-liquid separator. The gasified dewatering solvent was passed to a dryer 6, where the dewatering solvent was dried. The dried dewatering solvent was pressurized through an air compressor 7 and flowed into the solvent recovery condenser 8 or the solvent cylinder 1 for reuse.

The above process was performed at room temperature, the microwave power was 462 W and the microwave time was 60 s for the pretreatment, the stirring speed was 50 rad/min, and the contact time between the liquid dewatering solvent and the algae residue (i.e., extraction time) was 30 min. The algae residue having a moisture content of 79.1% had a decreased moisture content of 24.2% after the above dewatering.

Example 5

In this example, methyl ethyl ether was used as dewatering solvent, and a pharmacy fungi residue was used as biological solid material to be dewatered, and had a moisture content of 77.4% after mechanical dewatering. Following the solvent dewatering method and principle as described in the front part, 40 g of the fungi residue was placed in a dewatering reactor 3 with a microwave generator 4, where microwave power and time were set for microwave pretreatment. A solvent cylinder 1 was opened, and a gaseous dewatering solvent was flowed to a condenser 8 (temperature −25° C., 0.1 MPa), and cooled down to be liquefied as liquid dewatering solvent. A valve of a high-pressure nitrogen cylinder was opened, the liquid dewatering solvent was flowed into a solvent reservoir 2, and the flow of the dewatering solvent was controlled by a flow meter. The liquid dewatering solvent flowed to the dewatering reactor 3 (temperature: room temperature 25° C., 0.6 MPa), where the liquid dewatering solvent was contacted with the fungi residue to be dewatered, and moisture in the fungi residue entered the liquid dewatering solvent. A valve was opened, and the dewatering solvent with moisture dissolved therein flowed out of the dewatering reactor 3 into a gas-liquid separator 5. Due to increase in the temperature of the liquid dewatering solvent and decrease in the ambient pressure, when the room temperature was greater than the boiling point temperature of methyl ethyl ether (7.4° C.), the liquid dewatering solvent was gasified, and moisture remained in a liquefied state and was left in the gas-liquid separator; when the room temperature was smaller than the boiling point temperature of methyl ethyl ether, the gasification device required to be externally heated so as to facilitate gasification of methyl ethyl ether to be separated from the moisture. The gasified dewatering solvent was passed to a dryer 6, where the dewatering solvent was dried. The dried dewatering solvent was pressurized through an air compressor 7 and flowed into the solvent recovery condenser 8 or the solvent cylinder 1 for reuse.

The above process was performed at room temperature 25° C., the microwave power was 462 W and the microwave time was 30 s for the pretreatment, the stirring speed was 50 rad/min, and the contact time between the liquid dewatering solvent and the fungi residue (i.e., extraction time) was 20 min. The fungi residue having a moisture content of 77.4% had a decreased moisture content of 18.2% after the above dewatering.

Example 6

In this example, the dewatering effect of only microwave treatment, direct solvent treatment without microwave pretreatment and a combination treatment of microwave pretreatment and solvent extraction was compared.

Only microwave treatment was used. A mechanically dewatered sludge was used as biological solid material to be dewatered and had a sludge moisture content of 71.6%. 40 g of the sludge was placed in a dewatering reactor with a microwave generator, and the microwave power was set to be 595 w and the microwave time was 120 s. The mechanically dewatered sludge having a moisture content of 71.6% had a decreased moisture content of 50.9% after the treatment.

Direct solvent treatment without microwave pretreatment was used. Dimethyl ether that is gas at 25° C. and 1 atm was used as dewatering solvent, and a mechanically dewatered sludge was used as biological solid material to be dewatered, and had a sludge moisture content of 71.6%. 40 g of the mechanically dewatered sludge was placed in a dewatering reactor 3, without microwave pretreatment. A solvent cylinder 1 was opened, and a gaseous dewatering solvent was flowed to a condenser 8 (temperature −25° C., 0.1 MPa), and cooled down to be liquefied as liquid dewatering solvent. A valve of a high-pressure nitrogen cylinder was opened, the liquid dewatering solvent was flowed into a solvent reservoir 2, and the flow of the dewatering solvent was controlled by a flow meter. The liquid dewatering solvent flowed to the dewatering reactor 3 (temperature: room temperature, 0.6 MPa), where the liquid dewatering solvent was contacted with the sludge to be dewatered, and moisture in the sludge entered the liquid dewatering solvent. A valve was opened, and the dewatering solvent with moisture dissolved therein flowed out of the dewatering reactor 3 into a gas-liquid separator 5. Due to increase in the temperature of the liquid dewatering solvent and decrease in the ambient pressure, the liquid dewatering solvent was gasified, and moisture remained in a liquefied state and was left in the gas-liquid separator 5. The gasified dewatering solvent was passed to a dryer 6, where the dewatering solvent was dried. The dried dewatering solvent was pressurized through an air compressor 7 and flowed into the solvent recovery condenser 8 or the solvent cylinder 1 for reuse. The contact time between the liquid dewatering solvent and the sludge (i.e., extraction time) was 30 min. The mechanically dewatered sludge having a moisture content of 71.6% had a decreased moisture content of 21.0% after the above dewatering.

A combination treatment of microwave pretreatment and solvent extraction similar to that in example 1 was used. Under the conditions of microwave power of 595 W, microwave time of 120 s, and contact time between the liquid dewatering solvent and the sludge after microwave pretreatment (i.e., extraction time) of 30 min, the mechanically dewatered sludge having a moisture content of 71.6% had a decreased moisture content of 9.4% after the dewatering. The dewatering effect was significantly improved compared to that obtained with only microwave treatment and direct solvent extraction treatment without microwave pretreatment.

Example 7

In this example, ethanol that was liquid at normal temperature was used as dewatering solvent, and a pharmacy fungi residue was used as biological solid material to be dewatered, and had a moisture content of 77.4% after mechanical dewatering. Following the solvent dewatering method and principle as described in the front part, 40 g of the fungi residue was placed in a dewatering reactor 3 with a microwave generator 4, where microwave power and time were set for microwave pretreatment. In the microwave pretreatment of the above process, the microwave power was 462 W, the microwave time was 60 s for the pretreatment, and the stirring speed was 50 rad/min. A solvent cylinder 1 was opened, and a gaseous dewatering solvent was flowed to a condenser 8 (temperature 25° C., 0.1 MPa). A valve of a high-pressure nitrogen cylinder was opened, the liquid dewatering solvent was flowed into a solvent reservoir 2, and the flow of the dewatering solvent was controlled by a flow meter. The liquid dewatering solvent flowed to the dewatering reactor 3 (temperature: room temperature 25° C., 0.6 MPa), where the liquid dewatering solvent was contacted with the fungi residue to be dewatered for 30 min (i.e. extraction time), and moisture in the fungi residue entered the liquid dewatering solvent. A valve was opened, and the dewatering solvent with moisture dissolved therein flowed out of the dewatering reactor 3 into a gas-liquid separator 5. The gas-liquid separator 5 was a sieve-plate column rectifying apparatus used in laboratories, where the bottom pressure was maintained at 0.06 MPa, the top temperature was 87.1° C., the bottom temperature was 98.3° C., and the reflux ratio was 4. The dewatering solvent separated by rectification was passed to a dryer 6, where the dewatering solvent was dried with calcium oxide. The dried dewatering solvent flowed into the solvent recovery condenser 8 or the solvent cylinder 1 for reuse.

The fungi residue having a moisture content of 77.4% had a decreased moisture content of 28.3% after the above dewatering.

Example 8

In this example, acetone that was liquid at normal temperature was used as dewatering solvent, and a brewing and fermentation residue was used as biological solid material to be dewatered, and had a moisture content of 81.5% after mechanical dewatering. Following the solvent dewatering method and principle as described in the front part, 40 g of the residue was placed in a dewatering reactor 3 with a microwave generator 4, where microwave power and time were set for microwave pretreatment. In the pretreatment of the above process, the microwave power was 462 W, the microwave time was 120 s, and the stirring speed was 50 rad/min. A solvent cylinder 1 was opened, and a gaseous dewatering solvent was flowed to a condenser 8 (temperature 25° C., 0.1 MPa). A valve of a high-pressure nitrogen cylinder was opened, the liquid dewatering solvent was flowed into a solvent reservoir 2, and the flow of the dewatering solvent was controlled by a flow meter. The liquid dewatering solvent flowed to the dewatering reactor 3 (temperature: room temperature 25° C., 0.6 MPa), where the liquid dewatering solvent was contacted with the residue to be dewatered for 30 min (i.e. extraction time) at room temperature, and moisture in the residue entered the liquid dewatering solvent. A valve was opened, and the dewatering solvent with moisture dissolved therein flowed out of the dewatering reactor 3 into a gas-liquid separator 5. The gas-liquid separator 5 was a sieve-plate column rectifying apparatus used in laboratories, where the bottom pressure was maintained at 0.06 MPa, the top temperature was 67.1° C., the bottom temperature was 97.3° C., and the reflux ratio was 4. The solvent after rectification was passed to a dryer 6, where the dewatering solvent was dried with calcium oxide. The dried dewatering solvent flowed into the solvent recovery condenser 8 or the solvent cylinder 1 for reuse.

The brewing and fermentation residue having a moisture content of 81.5% had a decreased moisture content of 23.3% after the above extraction dewatering.

What is claimed is:

1. A method for dewatering a biological solid material employing both microwave irradiation and solvent extraction, comprising the following steps:
    (A) microwave irradiation pretreatment: wherein a biological solid material to be treated is subjected to microwave irradiation treatment;
    (B) solvent extraction dewatering: wherein the biological solid material subjected to the microwave irradiation treatment in step (A) is contacted with an extraction dewatering solvent, such that moisture in the biological solid material is dissolved into the extraction dewatering solvent;
    (C) solid-liquid separation: wherein the mixture of the biological solid material with the moisture removed and the solvent-water mixture obtained in step (B) is subjected to solid-liquid separation to obtain a dewatered biological solid material and the solvent-water mixture; and
    (D) solvent recovery: wherein solvent and water in the solvent-water mixture obtained in step (C) are separated, and the solvent is recovered for reuse.

2. The method for dewatering the biological solid material employing both microwave irradiation and solvent extraction according to claim 1, wherein in step (A), conditions of the microwave irradiation are: irradiation power 0.1 to 100000 Watt and irradiation time 0.01 to 600 minutes.

3. The method for dewatering the biological solid material employing both microwave irradiation and solvent extraction according to claim 1, wherein in step (B), the extraction dewatering solvent is an organic solvent that is gaseous at normal temperature and atmospheric pressure or easy to gasify and is water-miscible in a liquefied state.

4. The method for dewatering the biological solid material employing both microwave irradiation and solvent extraction according to claim 3, wherein the organic solvent is any one of an alkyl solvent, an alcohol solvent, an aldehyde solvent, a ketone solvent, and an ether solvent, or a mixture thereof.

5. The method for dewatering the biological solid material employing both microwave irradiation and solvent extraction according to claim 1, wherein in step (B), the solvent extraction dewatering is operated under conditions of 0 to 99° C. and 0 to 10.0 MPa.

6. The method for dewatering the biological solid material employing both microwave irradiation and solvent extraction according to claim 1, wherein in step (C), the solid-liquid separation is filtration or centrifugation, and in step (D), the solvent and water are separated by evaporation under reduced pressure, standing separation, centrifugal separation, or distillation separation.

7. The method for dewatering the biological solid material employing both microwave irradiation and solvent extraction according to claim 1, wherein in step (A), the biological solid material to be treated is any one of a wastewater sludge, a river sediment, a lake sediment, a marine sediment, a pharmacy fungi residue, other industrial fungi residues, a river algae residue, a lake algae residue, a marine algae residue, a food industry residue, a fermentation residue, a coal with high moisture content, and an agricultural residue.

8. An apparatus for dewatering a biological solid material, comprising a solvent storage unit, a dewatering reaction unit with a microwave generator, a solid-liquid separation unit, a gas-liquid separation unit, a gas liquefaction unit, and a solvent recovery unit, connected in series sequentially in order;

wherein, the solvent storage unit is a solvent reservoir;

the dewatering reaction unit is a dewatering reactor provided with a microwave energy output stick and a stirring device therein, the microwave energy output stick is controlled by the microwave generator;

the solid-liquid separation unit is a filtration separation device, a standing separation reservoir, or a centrifuge;

the gas-liquid separation unit is a gas-liquid separator and a dryer, connected in series; and the gas liquefaction unit is an air compressor and a solvent recovery condenser, connected in series.

9. The apparatus for dewatering the biological solid material according to claim 8, wherein the dewatering reaction unit is coupled to the solid-liquid separation unit, a filter screen of the solid-liquid separation unit is provided at an upper part and at the bottom within an interior space of the dewatering reactor.

10. The apparatus for dewatering the biological solid material according to claim 8, wherein a heating ring is provided on an outer wall of the gas-liquid separator.

* * * * *